United States Patent [19]

Nakamura et al.

[11] 4,274,358
[45] Jun. 23, 1981

[54] ILLUMINATED INDICATOR GAUGE

[75] Inventors: Kenji Nakamura, Yokosuka; Masao Ishikawa, Yokohama; Akio Ajimine, Tokyo, all of Japan

[73] Assignee: Nissan Motor Company, Limited, Yokohama, Japan

[21] Appl. No.: 46,616

[22] Filed: Jun. 8, 1979

[30] Foreign Application Priority Data

Jun. 26, 1978 [JP] Japan ............................ 53-86694[U]

[51] Int. Cl.³ .......................................... G01D 11/28
[52] U.S. Cl. ........................................ 116/288; 362/28
[58] Field of Search ................ 116/286, 288, 332, 328

[56] References Cited

U.S. PATENT DOCUMENTS

| 2,831,453 | 4/1958 | Hardesty | 116/288 |
|---|---|---|---|
| 3,033,155 | 5/1962 | Beckman | 116/288 |
| 3,129,691 | 4/1964 | Walker | 116/328 |
| 3,559,616 | 2/1971 | Protzmann | 116/332 |
| 4,163,428 | 8/1979 | Ishikawa | 116/288 |
| 4,218,726 | 8/1980 | Fukasawa et al. | 116/288 X |

FOREIGN PATENT DOCUMENTS 2015161 9/1979 United Kingdom .................... 116/288

Primary Examiner—Daniel M. Yasich

[57] ABSTRACT

The hub section of a pointer is provided with first and second light reflecting curved surfaces which are arranged on opposite portions with respect to the axis of the spindle of the movement. The first light reflecting curved surface is formed on a part of walls defining a recess formed in the hub portion.

10 Claims, 7 Drawing Figures

ILLUMINATED INDICATOR GAUGE

FIELD OF THE INVENTION

The present invention relates in general to an illuminated indicator gauge, such as speedometer and tachometer used in a motor vehicle, and more particularly to such a gauge having an illuminated pointer.

OBJECTS OF THE INVENTION

It is an object of the present invention to provide an illuminated indicator gauge having a light weight, neatly compact illuminated pointer.

It is another object of the present invention to provide an illuminated indicator gauge in which almost all light rays directing toward the hub section of the pointer are effectively utilized for illumination of the pointer.

Other objects and advantages of the present invention will become clear from the following description when taken in conjunction with the accompanying drawings.

DESCRIPTION OF PRIOR ART

Prior to describing in detail the construction of the illuminated indicator gauge of the invention, explanation of the conventional gauges will be made with reference to FIGS. 1 and 2 in order to clarify the invention.

Figures 1, 2:
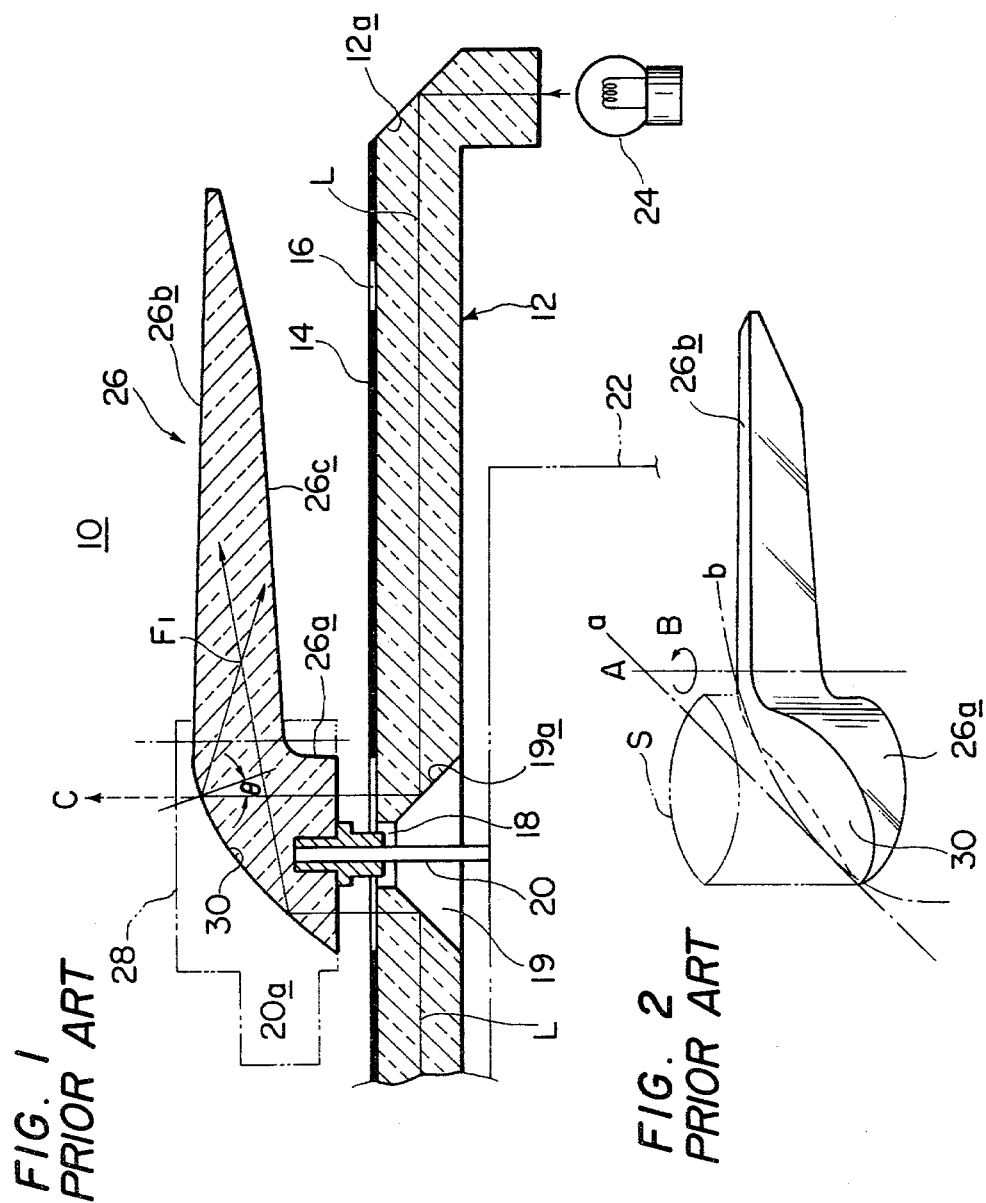
FIG. 1 is a sectional view of an essential part of a conventionally used illuminated indicator gauge.
FIG. 2 is a perspective view of the illuminated pointer used in the gauge of FIG. 1.

Referring to FIGS. 1 and 2, particularly to FIG. 1, there is illustrated an illuminated indicator gauge 10 which is conventionally used nowadays. The gauge 10 comprises a dial board 12 constructed of transparent material such as acryl resin and/or polycarbonate resin. Opaque layer 14 is applied on the surface of the board 12 to form indicia or graduation 16 thereon. The dial board 12 is formed at a predetermined position with an opening 18 for spacedly receiving therein a spindle 20 extending from a movement 22 of the gauge 10. The opening 18 is merged with a recess 19 formed in the dial board 12, the recess 19 having inclined light reflecting surfaces 19a as shown. The dial board 12 is further formed along the peripheral edge thereof with an inclined surface 12a. Suitable numbers of light sources 24 (only one is shown) are arranged around the periphery of the dial board 12 so that the light rays from the light sources 24 can pass through the transparent dial board 12 in a manner as is indicated by lines "L".

Supported by the spindle 20 is an indicator pointer 26 which swingably moves over the face of the dial board 12 in response to rotation of the spindle 20 about the axis thereof. The pointer 26 is constructed of transparent material such as acryl resin or the like and comprises a cylindrical hub section 26a fixedly mounted via a bearing member 20a on the leading end of the spindle 20 and an elongate indicating section 26b which radially outwardly extends from the hub section 26a, as shown. Indicated by phantom lines 28 is a cap which covers the hub section 26a of the pointer 26, acting as a balancer of the pointer 26 to achieve the balanced rotation or swing of the pointer 26. The hub section 26a of the pointer 26 is formed with a convex surface 30 for reflecting the light rays coming thereto toward the indicating section 26b for illumination of the same.

With the above, the light rays "L" emitting from the light sources 24 enter the dial board 12 from the periphery of the board 12 and reflect on the inclined surface 12a to be directed toward the recess 19, and then reflect on the light reflecting surface 19a of the recess 19 to enter the hub section 26a of the pointer 26. The light rays "L" thus entered then reflect upon the convex surface 30 to be directed toward the indicating section 26b to illuminate the irregularly finished rear surface 26c of the pointer 26.

In one conventional case, the convex surface 30 of the hub section 26a is formed by cutting an imaginary cylinder S forming a part of the hub section 26a (see FIG. 2) by a straight line a which rotates as indicated by arrow B about an axis A with an inclination angle of about 45 degrees with respect to the axis A, the axis A being a line which is parallel with the axis of the spindle 20 and passes through a conjunction portion where the hub section 26a and the indicating section 26b are united. In this conventional case, however, the height of the pointer 26, that is, the distance between the bottom of the hub section 26a and the outside surface of the indicating section 26b increases to induce heavier weight and bulky construction of the pointer 26, so that not only smooth rotation of the pointer but also well balanced appearance of the same is not expected.

For elimination of this drawback, another measure has been proposed in the pointer 26 in which the convex surface 30 of the hub section 26a is formed by cutting the cylinder S by a quadratic curved line b (see FIG. 2) which rotates about the axis A so that the curved surface (30) of revolution thus provided has a light focusing point $F_1$ (see FIG. 1) within the indicating section 26b. Theoretically, all of the light rays directed toward the curved surface 30 are reflected toward the light focusing point $F_1$, however, in fact, most of the light rays incident upon an upper section of the curved surface 30 where the inclination of the surface with respect to the axis A is relatively small, do not reflect on the curved surface 30 but are transmitted to the outside as is indicated by arrow C. This is because the incident angle $\theta$ of the light rays upon such upper section is much smaller than the critical angle (acryl resin: 42 degrees, polycarbonate resin: 39 degrees) for the total reflection. Thus, in this measure, effective illumination of the pointer 26 is not expected.

DESCRIPTION OF THE PREFERRED EMBODIMENT

To solve the above-mentioned problem is the essential object of the invention. FIGS. 3 to 7 show several embodiments of the present invention in which similar parts to the above-mentioned conventional gauge 10 are designated by the same reference numerals as in the case of the gauge 10. For facilitation of the description and the drawings, detailed explanation of such same parts will be omitted from the following and the cap for the hub section of the pointer is omitted from the drawings.

Figure 3:
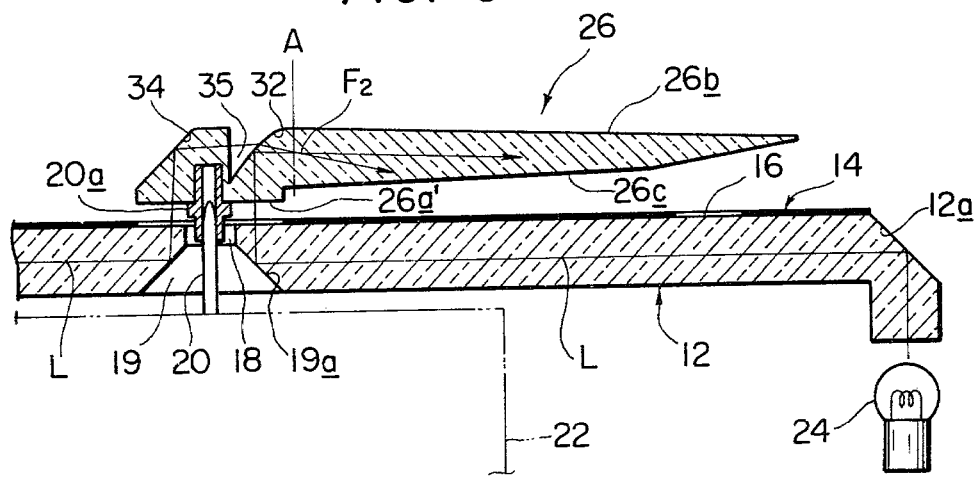
FIG. 3 is a view similar to FIG. 1, but shows a first preferred embodiment of the invention.

Referring to FIG. 3 of the drawings, there is shown a first preferred embodiment of the invention. The hub section 26a' of the pointer 26 of this embodiment has a first convex surface 32 and a second convex surface 34 which are formed on opposite portions with respect to the axis of the spindle 20. A recess 35 is formed in the hub section 26a' for providing a wall on which the first convex surface 32 is defined. The first convex surface 32 forms a part of a locus which is provided by rotating a quadratic curved line about the axis A which is parallel with the axis of the spindle 20 and passes through a conjunction portion where the hub section 26a' and the indicating section 26b are united, and the second convex surface 34 forms a part of a locus which is provided by rotating a straight line about the axis A, the straight line being inclined about 45 degrees with respect to the axis of the spindle 20. Designated by reference $F_2$ is a light focusing point provided by the first convex surface 32.

Thus, the light rays entering the hub section 26a' through a portion adjacent the connecting part of the hub and the indicating sections 26a' and 26b reflect upon the first convex surface 32 to be directed toward the indicating section 26b, and the light rays entering the hub section 26a' through a portion distant from the connecting part reflect upon the second convex surface 34 to be directed toward the indicating section 26b. Thus, all of the light rays toward the hub section 26a' are effectively utilized for illumination of the pointer 26. In addition, since the height of the pointer 26 can be made small inducing light weight construction of the pointer 26, smooth rotation of the pointer 26 is expected.

However, in this first embodiment, most of the light rays coming from the second convex surface 34 reflect steeply downwards at the first convex surface 32, as shown in FIG. 3. Thus, unevenness of illumination on the indicating section 26b tends to occur.

Figure 4:
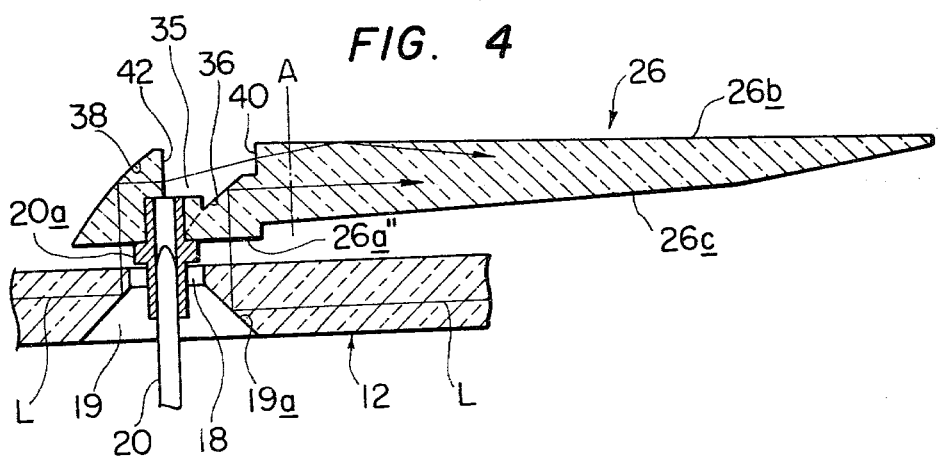
FIG. 4 is a view similar to FIG. 1, but shows a second preferred embodiment of the invention.

Referring to FIG. 4, there is illustrated a second embodiment of the invention which can solve the problem encountered in the first embodiment. The hub section 26a'' of this second embodiment has, similarly to the first embodiment, first and second convex surfaces 36 and 38 which are arranged on opposite positions with respect to the axis of the spindle 20, as shown. The first convex surface 36 is positioned somewhat below the upper end of the hub section 26a'' to leave on the upper portion a flat surface 40 which is parallel with the axis of the spindle 20. The first convex surface 36 forms a part of a locus provided by rotating a straight line about the axis A with an inclination angle of about 45 degrees of the line with respect to the axis of the spindle 20. The second convex surface 38 forms a part of a locus which is provided by rotating a quadratic curved line about the axis A and has a light focusing point in the vicinity of the flat surface 40. Arranged behind the second convex surface 38 is a flat surface 42 from which the light rays coming from the second convex surface 38 are emitted into the open air in the recess 35.

With the above-stated construction of the second embodiment, the light rays entering the hub section 26a'' through a portion adjacent the connecting part of the hub and the indicating sections 26a'' and 26b reflect upon the first convex surface 36 to be directed toward the indicating section 26b to travel in the same parallelly with respect to the longitudinal axis of the pointer 26, and the light rays entering the hub section 26a'' through a portion distant from the connecting part reflect upon the second convex surface 38 to be directed toward the recess 35. The light rays transmitted into the open air of the recess 35 then enter the indicating section 26b of the pointer 26 through the flat surface 40. By the provision of the flat surface 40 on the pointer 26, the light rays from the second convex surface 38 will travel in the indicating section 26b a relatively long distance to reach positions far from the hub section 26a'' even when reflection of the light rays on the upper surface of the indicating section 26b occurs. This is because the incident angle of the light rays to the flat surface 40 is small. Thus, the unwanted unevenness in illumination of the pointer 26 is prevented in this second embodiment.

Figure 5:
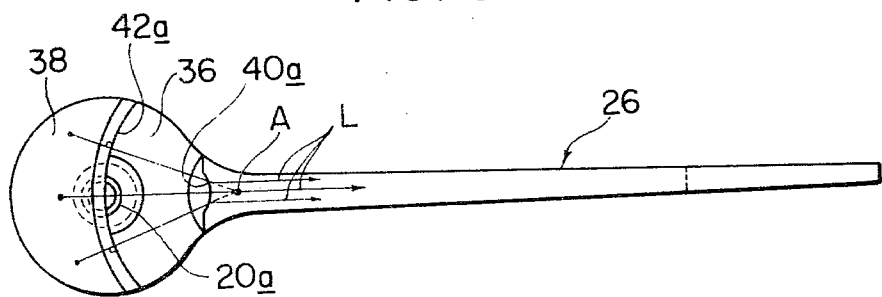
FIG. 5 is a plan view of an illuminated pointer which is provided by slightly modifying the pointer used in the gauge of FIG. 4.

FIG. 5 shows a modification of the pointer 26 of FIG. 4. In this modification, two concave surfaces 40a and 42a are provided as a substitute for the flat surfaces 40 and 42 of FIG. 4. The concave surface 40a forms a part of a locus which is provided by rotating a quadratic curved line about an imaginary axis parallel with the axis A and has a light focusing point within the pointer 26 in the vicinity of the axis A, the imaginary axis passing through a portion of the hub section 26a''. The other concave surface 42a forms a part of a locus provided by rotating a straight line parallel to the axis A about the axis A. With this construction, the light rays entering the indicating section 26b will travel in the same substantially in parallel with the longitudinal axis of the indicating section 26b because of the provision of the these concave surfaces 40a and 42a, so that illumination effect on the pointer 26 is much more enhanced.

Figure 6:
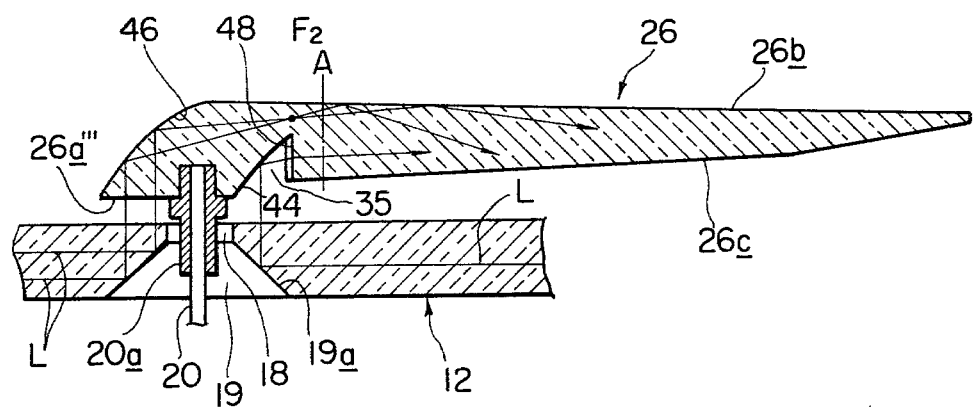
FIG. 6 is a view similar to FIG. 1, but shows a third preferred embodiment of the invention.
Figure 7:
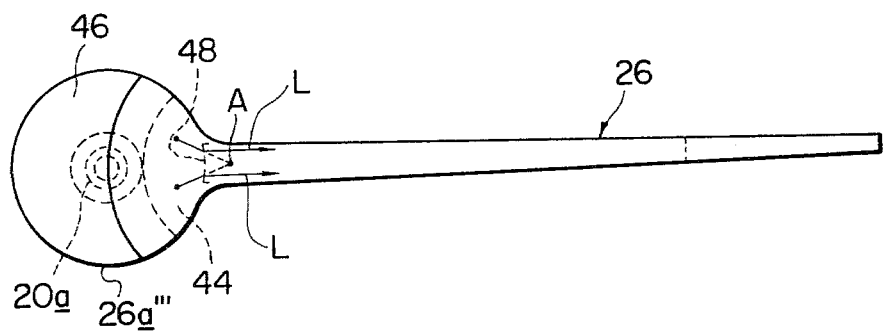
FIG. 7 is a plan view of the illuminated pointer used in the gauge of FIG. 6.

Referring to FIGS. 6 and 7, there is illustrated a third embodiment of the invention. The hub section 26a''' of this embodiment has a first concave surface 44, a second concave surface 48 and a convex surface 46. The first and second concave surfaces 44 and 48 are arranged on an opposite portion of the convex surface 46 with respect to the axis of the spindle 20, and the first concave surface 44 is positioned between the second concave surface 48 and the axis of the spindle 20, as shown. The first concave surface 44 forms a part of a locus which is provided by rotating a quadratic curved line about the axis A and has a light focusing point within the indicating section 26b, the second concave surface 48 forms a part of a locus which is provided by rotating a quadratic curved line about an imaginary axis parallel with the axis A and has a light focusing point within the indicating section 26b in the vicinity of the axis A, the imaginary axis passing through a portion of the hub section 26a'''. The convex surface 46 forms a part of a locus which is provided by rotating a quadratic curved line about the axis A and has a light focusing point $F_2$ within the pointer 26 in the vicinity of the connecting part of the hub and indicating sections 26a''' and 26b.

With this construction of the third embodiment, the light rays directed toward a portion adjacent the connecting part of the hub section 26a''' and the indicating section 26b will reflect upon the first concave surface 44 to be directed toward the second concave surface 48. The light rays thus reaching the second concave surface 48 then enter the indicating section 26b to travel in the same substantially in parallel with the longitudinal axis of the pointer 26, as is understood from FIG. 7. The parallelism of the light rays in the indicating section 26b is made by the second concave surface 48 which acts as a concave lens. The light rays directed toward a portion distant from the connecting part of the hub section 26a''' and the indicating section 26b will reflect upon the concave surface 46 to be directed toward the indicating section 26b and then reflect upon the upper surface of the indicating section 26b substantially in same manner as in the above-mentioned second embodiment of FIG. 4. Thus, illumination of the pointer 26 is effectively made.

With the above, it will be appreciated that, according to the invention, height of the pointer 26 can be made small thereby achieving light weight, neatly compact construction of the pointer, and almost all light rays directed toward the hub section 26a', 26a" or 26'" are utilized for illumination of the pointer 26.

What is claimed is:

1. An illuminated indicator gauge comprising:
   a dial board of transparent material having a hole formed therethrough;
   a spindle passing through said hole;
   a pointer of transparent material having an indicating section and a hub section connected to said spindle to move over a front face of said dial board in response to rotation of said spindle about its axis;
   light sources producing light rays which are to be transmitted entirely within said dial board in directions parallel with said front face of the dial board toward said hole;
   light reflecting means for reflecting light rays, which have come to said hole through said dial board from said light sources, toward the hub section of said pointer; and
   first and second light reflecting surfaces formed on said hub section of said pointer at opposite portions with respect to the axis of said spindle for reflecting light rays, which have come thereto from said light reflecting means, toward an indicating section of said pointer, one of said first and second light reflecting surfaces being formed by a recess in that part of said hub section adjacent to said spindle and to the indicating section of said pointer,
   and wherein the other one of said first and second light reflecting surfaces is a curved surface which is constructed to allow light rays, which have come thereto through said hub section from said light reflecting means, to be focused in said pointer at a preselected portion between said curved surface and said indicating section of said pointer for providing uniform illumination thereof.

2. An illuminated indicator gauge as claimed in claim 1 in which a recess is formed at an inboard surface of said hub section, and in which said first light reflecting surface is located closer to a portion of said hub section from which said indicating section extends than said second light reflecting surface, further in which said first light reflecting surface constitutes a part of a wall which bounds said recess.

3. An illuminating indicator gauge comprising:
   a dial board of transparent material having a hole formed therethrough;
   a spindle passing through said hole;
   a pointer of transparent material having an indicating section and a hub section connected to said spindle to move over a front face of said dial board in response to rotation of said spindle about its axis;
   light sources producing light rays which are to be transmitted entirely within said dial board in directions parallel with said front face of said dial board toward said hole;
   light reflecting means for reflecting light rays, which have come to said hole through said dial board from said light sources, toward the hub section of said pointer; and
   first and second light reflecting surfaces formed on said hub section of said pointer at opposite portions with respect to the axis of said spindle for reflecting and focusing light rays, which have come thereto from said light reflecting means, at a preselected point in the indicating section of said pointer, said first light reflecting surface being located closer to a portion of said hub section from which said indicating section extends than said second light reflecting surface, said first light reflecting surface constituting a part of a wall which bounds a recess formed in that part of said hub section adjacent to said spindle and to the indicating section of said pointer, said recess being formed at an outboard surface of said hub section, said first light reflecting surface being a curved surface which is constructed to allow light rays, which have come thereto through said hub section from said light reflecting means, to be focused in said pointer at a portion between said curved surface and said indicating section of said pointer;
   and wherein said curved surface of said first light reflecting surface forms a part of a locus which is provided by rotating a quadratically curved line about an imaginary axis parallel to the axis of said spindle, said imaginary axis passing through said pointer in the vicinity of the connecting part of said hub section and said indicating section;
   and wherein said second light reflecting surface is a curved surface forming a part of a locus which is provided by rotating a straight line about said imaginary axis with an inclination angle of approximately 45 degrees with respect to the axis of said spindle.

4. An illuminating indicator gauge comprising:
   a dial board of transparent material having a hole formed therethrough;
   a spindle passing through said hole;
   a pointer of transparent material having an indicating section and a hub section connected to said spindle to move over a front face of said dial board in response to rotation of said spindle about its axis;
   light sources producing light rays which are to be transmitted entirely within said dial board in directions parallel with said front face of said dial board toward said hole;
   light reflecting means for reflecting light rays, which have come to said hole through said dial board from said light sources, toward the hub section of said pointer; and
   first and second light reflecting surfaces formed on said hub section of said pointer at opposite portions with respect to the axis of said spindle for reflecting and focusing light rays, which have come thereto from said light reflecting means, at a preselected point in the indicating section of said pointer, said first light reflecting surface being located closer to a portion of said hub section from which said indicating section extends than said second light reflecting surface, said first light reflecting surface constituting a part of a wall which bounds a recess formed in that part of said hub section adjacent to said spindle and to the indicating section of said pointer, said recess being formed at an outboard surface of said hub section, said first light reflecting surface being curved surface which is constructed to allow light rays, which have come thereto through said hub section from said light reflecting means, to be focused in said pointer at a portion between said curved surface and said indicating section of said pointer;

and wherein the curved surface of said first light reflecting surface forms a part of a locus which is provided by rotating a straight line about an imaginary axis parallel to the axis of said spindle with an inclination angle of approximately 45 degrees with respect to the axis of said spindle, said imaginary axis passing through said pointer in the vicinity of the connecting part of said hub section and said indicating section;

and wherein said second light reflecting surface is a curved surface forming a part of a locus which is provided by rotating a quadratically curved line about said imaginary axis.

5. An illuminating indicating gauge as claimed in claim 4, in which said hub section has a third surface at a position above said first light reflecting surface and a fourth surface at a position behind said second light reflecting surface, said third and fourth surfaces forming parts of walls of said recess so that the light rays which have been reflected upon the second light reflecting surface are transmitted through said fourth surface into the open air defined by said recess and then enter said indicating section of said pointer through said third surface.

6. An illuminating indicating gauge as claimed in claim 5, in which said third and fourth surfaces are flat and parallel with the axis of said spindle.

7. An illuminating indicating gauge as claimed in claim 5, in which said third and fourth surfaces are concave, the third concave surface being a part of a locus which is provided by rotating a quadratically curved line about another imaginary axis parallel to the axis of said spindle, said another imaginary axis passing through a portion of said hub section, the fourth concave surface being a part of a locus which is provided by rotating a straight line parallel to the axis of said spindle about the before-mentioned imaginary axis.

8. An illuminating indicator gauge comprising:
a dial board of transparent material having a hole formed therethrough;
a spingle passing through said hole;
a pointer of transparent material having an indicating section and a hub section connected to said spindle to move over a front face of said dial board in response to rotation of said spindle about its axis;
light sources producing light rays which are to be transmitted entirely within said dial board in directions parallel to said front face of said dial board toward said hole;
light reflecting means for reflecting light rays, which have come to said hole through said dial board from said light sources, toward the hub section of said pointer; and
first and second light reflecting surfaces formed on said hub section of said pointer at opposite portions with respect to the axis of said spindle for reflecting light rays, which have come thereto from said light reflecting means, toward the indicating section of said pointer, one of said first and second light reflecting surfaces being formed by a recess in that part of said hub section adjacent to said spindle and to the indicating section of said pointer, the other one of said first and second light reflecting surface being a curved surface which is constructed to allow light rays, which have come thereto through said hub section from said light reflecting means, to be focused in said pointer at a preselected portion between said curved surface and said indicating section of said pointer for providing uniform illumination thereof;
and wherein said recess is formed at the inboard surface of said hub section and wherein said first light reflecting surface is located closer to a portion of said hub section from which said indicating section extends than said second light reflecting surface, and wherein said first light reflecting surface constitutes a part of a wall which bounds said recess.

9. An illuminating indicator gauge as claimed in claim 8 in which said hub section has a third surface at an opposite position to said first light reflecting surface, said third surface forming a part of wall of said recess so that the light rays which have been reflected upon said first light reflecting surface enter said indicating section of said pointer through said third surface.

10. An illuminating indicator gauge as claimed in claim 9, in which said third surface is a part of locus which is provided by rotating a quadratically curved line about another imaginary axis parallel to the axis of said spindle, said another imaginary axis passing through a portion of said hub section.

* * * * *